United States Patent
Gaessler et al.

(10) Patent No.: US 10,977,516 B2
(45) Date of Patent: Apr. 13, 2021

(54) METHOD FOR IDENTIFYING OBJECTS AND OBJECT IDENTIFICATION DEVICE

(71) Applicant: IOSS Intelligente Optische Sensoren & Systeme GmbH, Radolfzell (DE)

(72) Inventors: Joachim Gaessler, Donaueschingen (DE); Harald Richter, Radolfzell (DE); Christian Konz, Oehningen-Wangen (DE)

(73) Assignee: IOSS Intelligente Optische Sensoren & Systeme GmbH, Radolfzell (DE)

( * ) Notice: Subject to any disclaimer, the term of this patent is extended or adjusted under 35 U.S.C. 154(b) by 27 days.

(21) Appl. No.: 16/463,661

(22) PCT Filed: Dec. 9, 2016

(86) PCT No.: PCT/EP2016/080472
§ 371 (c)(1),
(2) Date: May 23, 2019

(87) PCT Pub. No.: WO2018/103862
PCT Pub. Date: Jun. 14, 2018

(65) Prior Publication Data
US 2020/0082203 A1    Mar. 12, 2020

(51) Int. Cl.
*G06K 9/62*    (2006.01)
*G06T 1/20*    (2006.01)

(52) U.S. Cl.
CPC .......... *G06K 9/623* (2013.01); *G06K 9/6256* (2013.01); *G06K 9/6262* (2013.01); *G06T 1/20* (2013.01); *G06K 2209/19* (2013.01); *G06K 2209/21* (2013.01)

(58) Field of Classification Search
CPC .................................. G06K 9/623; G06T 1/20
See application file for complete search history.

(56) References Cited

U.S. PATENT DOCUMENTS

| 4,542,528 A | 9/1985 | Sanner et al. |
| 8,542,930 B1* | 9/2013 | Negro ................ G06K 7/10722 382/190 |
| 2002/0198757 A1* | 12/2002 | Hegde .............. G06Q 10/06315 705/7.22 |

FOREIGN PATENT DOCUMENTS

EP    2 249 284 A2    11/2010

OTHER PUBLICATIONS

International Search Report and Written Opinion of the International Searching Authority dated Aug. 8, 2017 issued in corresponding International Patent Application No. PCT/EP2016/080472.
European Office Action dated Sep. 17, 2020 issued in corresponding EP Patent Application No. 16815777.4.

* cited by examiner

*Primary Examiner* — Tuan H Nguyen
(74) *Attorney, Agent, or Firm* — Posz Law Group, PLC

(57) ABSTRACT

A method for identifying objects, in particular substrates, in particular wafers, includes:
a prioritization process for generating a prioritized list of identification strategies including at least one identification strategy in at least one prioritization step; and
an identification process for capturing at least one image of at least one object in at least one image capturing step according to at least one highest priority identification strategy of the prioritized list and processing said image in at least one image processing step according to the highest priority identification strategy of the prioritized list.

17 Claims, 6 Drawing Sheets

METHOD FOR IDENTIFYING OBJECTS AND OBJECT IDENTIFICATION DEVICE

CROSS REFERENCE TO RELATED APPLICATIONS

Figure 1:
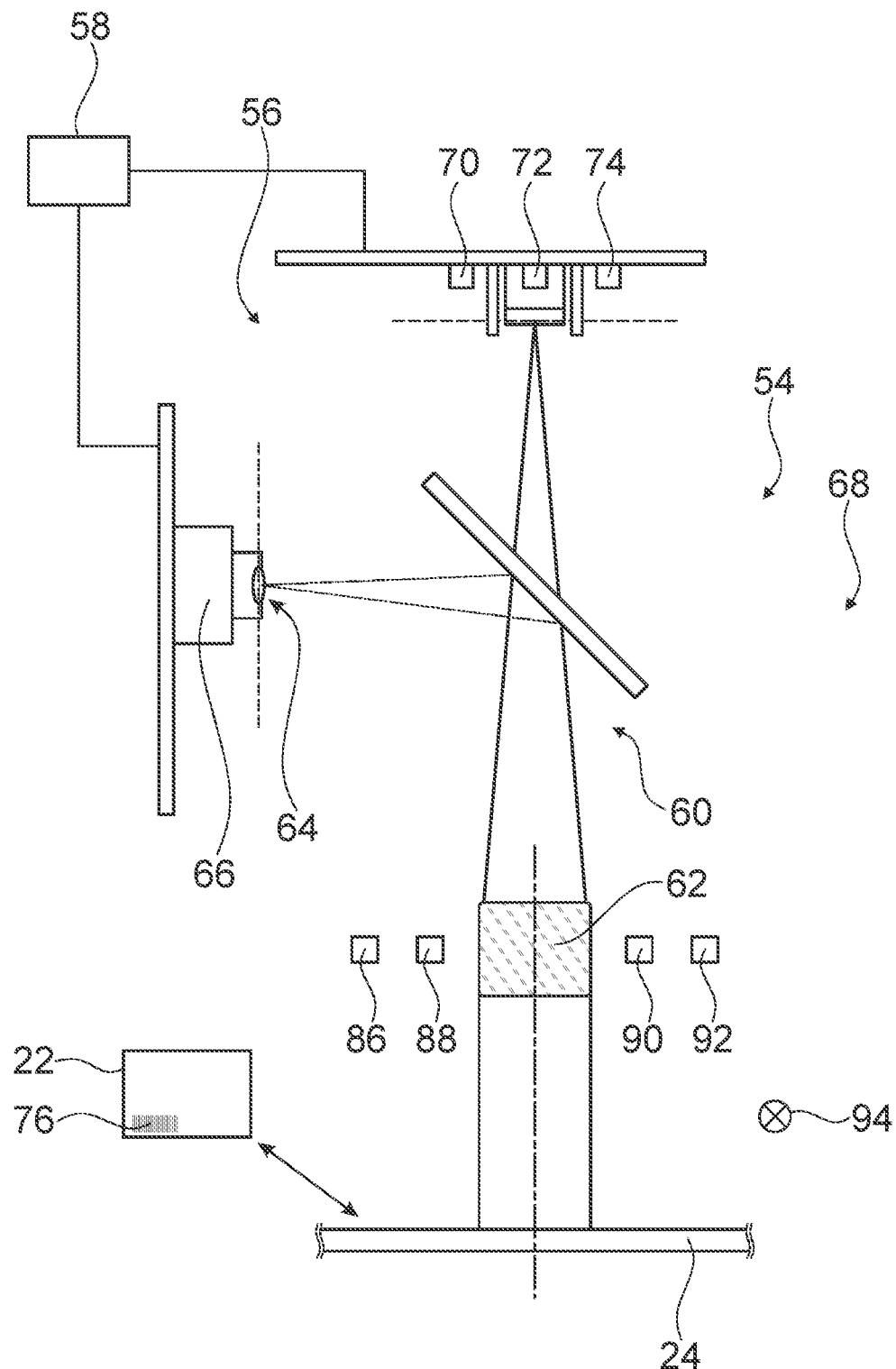

This application is a U.S. national stage application of PCT/EP2016/080472 filed on Dec. 09, 2016, the contents of which are incorporated herein by reference.

STATE OF THE ART

The invention relates to a method for identifying objects, in particular substrates, in particular wafers, and to an object identification device, in particular to a substrate identification device, in particular to a wafer identification device.

A device and a method for optically examining a wafer are known for instance from the document DE 10 2005 061 834 A1. According to the method from this document, several images of a wafer are taken using different light source configurations in a first step. These images are analyzed with respect to an average brightness in order to define which light source configuration corresponds to a bright field or to a dark field situation. Subsequently, several bright field and dark field images are taken and stored. These stored images are analyzed in order to identify the wafer.

Furthermore, from the document DE 10 2011 056 660 A1 a mark reader is known which captures several pictures prior to processing them, which are analyzed with respect to certain feature attributes after capturing them. These feature attributes are used as indicators for a chance for a successful decoding of the images. Based on the feature attribute analysis of the images a prioritized image list is generated, which contains the previously captured images. These images are then processed one after the other until a successful reading of a mark is achieved.

The objective of the invention is, in particular, to achieve advantageous properties concerning time-efficiency. Another objective of the invention is, in particular, to achieve a fast and/or efficient selection of suitable identification strategies for identifying an object, in particular a wafer. A further objective of the invention is, in particular, to provide a generic method and/or device which enables advantageously efficient and/or reliable self-learning. The objective is achieved according to the invention by the features of patent claims 1 and 14, while advantageous embodiments and further developments of the invention may be gathered from the dependent claims.

ADVANTAGES OF THE INVENTION

The invention refers to a method for identifying and in particular recognizing objects, in particular substrates, in particular wafers, comprising: a prioritization process for generating a prioritized list of identification strategies comprising at least one identification strategy in at least one prioritization step; and comprising an identification process for capturing at least one image in at least one image capturing step according to at least one highest priority identification strategy of the prioritized list and processing said image in at least one image processing step according to the highest priority identification strategy of the prioritized list.

By means of the invention a high degree of time-efficiency can be achieved. Furthermore, suitable strategies for identifying an object can be efficiently identified and/or applied. Advantageously, an efficient object identification for implementation in a production process can be provided. In particular, wafers with different labels and/or marks can be quickly and/or reliably identified and/or traced and/or kept track of, in particular in a production process. Furthermore, combinations of illumination conditions and analysis approaches can be sorted by an expected chance of success in a precise manner. Advantageously, a method and/or a device can be provided which is self-learning, in particular in a purposeful and/or targeted and/or efficient manner. Furthermore, a parallel analysis of images is advantageously enabled, in particular without the need for a pre-assessment of images.

In particular, the method is configured for identifying objects. In particular, the object may be in particular a finished or unfinished product, a primary product, a blank, a part, a device or the like. It is also conceivable that the object comprises and/or is implemented as at least one mark and/or labeling, for instance at least one bar code, at least one QR-code, at least one written label and/or number, at least one character string, at least one symbol and/or logogram and/or phonogram and/or graphem or the like, and/or at least one data matrix code and/or another preferably printed and/or written and/or engraved and/or 1D or 2D code of any type. In particular, the method is a method for identifying a mark and/or a label of an object. Preferably, the object is an advantageously flat and/or sheet-like and/or disc-like and/or plate-like substrate, in particular a wafer, further preferably a semiconductor wafer, for instance a silicon wafer, a compound II-VI material wafer or a compound III-V material wafer, in particular a gallium arsenide wafer. In this context, "configured" is in particular to mean specifically programmed, designed and/or equipped. By an object being configured for a certain function is in particular to be understood that the object implements and/or fulfills said certain function in at least one application state and/or operating state. Furthermore, by a method and/or a process being "configured" for a certain purpose is in particular to be understood that the method and/or process comprises at least one method step and/or process step and/or subroutine or the like, which implements and/or fulfills said certain purpose in at least one application state and/or operating state and which is in particular at least partly optimized for implementing and/or fulfilling said certain purpose. In addition, by a method step and/or a process step and/or a subroutine being "configured" for a certain purpose is in particular to be understood that the method step and/or the process step and/or the subroutine is implementing and/or fulfilling said purpose in at least one application state and/or operating state and is in particular at least partly optimized for implementing and/or fulfilling said purpose.

Preferably, the object is identified and/or identifiable in at least two different processing states of the object, for instance in a state prior to a first processing step, in particular when entering a fabrication line and/or a fabrication process, and in at least one pre-processed or finished state after at least one processing step, for instance an etching step, a deposition step, and/or a masking step or the like.

In particular, the prioritization process is configured for generating the prioritized list. In particular, the prioritization process is performed prior to the identification process. Preferably, the prioritization process finishes the prioritized list before the identification process is started. However, it is also conceivable that the identification process is started as soon as the prioritized list contains at least one entry. Advantageously, the prioritized list contains several in particular different identification strategies. In particular, the prioritization list contains different identification strategies sorted by an estimate of an a priori chance for being successfully applied to the object. Advantageously, the prioritized list is stored in at least one data storage unit. Preferably, the prioritization process is at least partly automated or automated. Advantageously, the prioritization process chooses the at least one identification strategy from a data base. Further advantageously, the data base comprises possible identification strategies, in particular all possible identification strategies, wherein "possible" in this context in particular means possible with respect to an availability of these identification strategies based on constraints owing to a hardware used.

Preferably, the highest priority identification strategy is the first entry of the prioritized list. Further preferably, the second entry of the prioritized list is the second highest priority identification strategy, and so on. In particular, the identification process is terminated upon successful identification of the object. It is also conceivable that the identification process is terminated upon reaching a time limit, which is preferably pre-set and/or pre-settable by a user. Furthermore, it is conceivable that the identification process is terminated upon reaching an end of the prioritized list. The object may be ultimately not identified in this case. However, preferably the identification process comprises at least one auxiliary mode, which may be entered after reaching the end of the prioritized list or a time limit. Advantageously, in the auxiliary mode additional identification strategies, which are in particular not in the prioritized list, are used. In particular, at least one image of the object is taken in at least one auxiliary image capturing step according to at least one auxiliary identification strategy. Preferably, the image taken in the auxiliary image capturing step is processed in at least one auxiliary image processing step according to the auxiliary identification strategy. In particular, different auxiliary identification strategies are, in particular randomly, chosen in the auxiliary mode. For instance, the different auxiliary identification strategies are, in particular randomly, chosen from a pre-defined list of auxiliary identification strategies, which preferably contains identification strategies that differ significantly, in particular concerning their image capturing recipes and/or their image processing approaches. Preferably, in the auxiliary mode a wild scan process generates a wild scan list. Further preferably, the wild scan list is a list of auxiliary image capturing recipes, which are preferably randomly chosen. Advantageously, a first image is captured according to the image capturing recipe of the first entry of the wild scan list. Further advantageously, at least one or several or preferably all available image processing approaches are applied to this image, at least unless the object is successfully identified. Preferably, this image is processed step by step according to sub-steps of a respective image processing step. Advantageously, results of each sub-step are separately stored and used to define and/or generate a threshold value for subsequent image processings. In case a subsequent image yields a better result in at least one image processing sub-step than the respective threshold value, this result is used to define and/or generate a new threshold value. In case a subsequent image yields results below the respective threshold in one or more sub-steps, the processing of this image may be cancelled in an unfinished state, which allows in particular for a high time efficiency. It is also conceivable that a threshold value is generated based on several sub-step results. In case the object could not be identified based on the image captured according to the first entry of the wild scan list, a next image is captured and processed using several or all available image processing approaches, and so forth. The auxiliary mode may be stopped upon reaching an end of the wild scan list, upon a user request, upon reaching a time limit or upon a different stop condition emerging. Instead of generating the wild scan list it is also conceivable that an auxiliary identification strategy is randomly chosen directly before it is applied. Advantageously, the image is at least temporarily stored, in particular in the data storage unit. In particular, the image is an image of at least a part of the object or of the entire object, preferably of at least a part of a surface of the object or of the entire surface of the object. Advantageously, the image is a digital image. Further advantageously, the image processing step is a computational processing step. Preferably, the identification process, in particular the image capturing step and/or the image processing step, is at least partly automated or automated.

In an advantageous embodiment of the invention it is proposed that the identification process comprises a sequential processing of the prioritized list. Preferably, entries of the prioritized list are processed sequentially and/or one after the other, further preferably starting from the first entry of the prioritized list. In particular, the identification process uses the highest priority identification strategy first, the second highest priority identification strategy second and so on. It is conceivable that a next identification strategy is used in a respective image capturing step and/or in a respective image processing step while a prior image processing step is still in progress. In particular, the image is taken first and subsequently processed according to the highest priority identification strategy. A next image according to the second highest priority identification strategy may be taken subsequently to the image, and in particular while the image is processed according to the highest priority identification strategy. As a result, promising identification strategies with the prospect of successful object identification can be determined prior to their application, in particular while eliminating waiting times for image processings between capturing images.

A high flexibility concerning identification of different objects, in particular differently marked wafers, can be achieved, in particular if the at least one identification strategy comprises at least one image processing approach featuring at least one image processing parameter. In particular, the image processing approach is configured for identifying the object based on a type of a mark and/or label of the object and/or for identifying a mark and/or a label. Preferably, the image processing approach is defined by the at least one processing parameter, in particular by several processing parameters. Processing parameters may for instance comprise certain software algorithms and/or input parameters for certain algorithms which refer to a type of a mark and/or label and/or to a type of the object and/or to other features of the object and/or its mark and/or label. Advantageously, the image processing approach may contain information about a type of a mark and/or label, a size of a mark and/or label and/or object, at least one filtering method that can be applied to a captured image, a region of interest of an object and/or a captured image, in particular an image section, or the like. Preferably, the data base comprises several different image processing approaches, in particular at least one image processing approach for identifying a barcode, at least one image processing approach for optical character recognition, at least one image processing approach for QR-code reading, at least one image processing approach for data matrix code reading, image processing approaches for one or more different 1D codes, image processing approaches for one or more 2D codes and the like.

Suitable images for different image processing approaches can be captured, in particular if the at least one identification strategy comprises at least one image capturing recipe featuring at least one image capturing parameter. In particular, the image capturing parameter may be an illumination type and/or an illumination intensity and/or an illumination color and/or an optical arrangement for capturing an image and/or a configuration of optical elements for capturing an image and/or a type of camera used or the like. Preferably, the image capturing recipe defines one procedure of several possible procedures for capturing an image of the object. In particular, at least one image capturing recipe is assigned to each image processing approach. Preferably, several image capturing recipes are assigned to each image processing approach, wherein in particular different image processing approaches might be associated to the same image capturing recipe. Advantageously, for each image processing approach the data base contains an in particular prioritized recipe list of image capturing recipes. In particular, a certain recipe list of a certain image processing approach contains the best and/or most promising image capturing recipes for taking an image which can be potentially successfully processed using the certain image processing approach.

In particular, the data base is configured for providing a two-staged memory, wherein image processing approaches and image capturing recipes are in particular separately stored. Preferably, image processing approaches are stored together with information concerning their success in a first stage of the two-staged memory. Advantageously, previously successful image processing approaches are stored in the first stage of the two-staged memory. Further preferably, image capturing recipes are stored together with an information concerning their success in combination with a specific image processing approach, in particular with the image processing approaches from the first stage of the two-staged memory. Advantageously, for each stored image processing approach, related, in particular previously successful and/or promising and/or potentially suitable image capture recipes, are stored in the second stage of the two-staged memory. As a result, an information concerning a suitability of a certain image capturing recipe for delivering a suitable image to be processed using a certain image processing approach can be efficiently stored and updated. Advantageously, a certain identification strategy is unambiguously defined by its image processing approach and its image capturing recipe. Further advantageously, a maximum number of possible identification strategies is given as a product of a maximum number of image processing approaches and a maximum number of image capturing recipes.

In a further embodiment of the invention it is proposed that the prioritization process adds at least one previously successful identification strategy to the prioritized list first. In particular, the prioritization process is configured for at least partly implementing a last-best strategy. Preferably, the prioritization process adds a previously successful image capturing recipe and/or image processing approach, for instance from the last successful image processing, to the prioritized list prior to adding other image capturing recipes and/or image processing approaches. It is also conceivable that the prioritization process is configured for adding several previously successful identification strategies and/or image capturing recipes and/or image processing approaches to the prioritized list first, in particular from the last several successful image processings, for instance from the last two or from the last three or from the last four or from the last five or from the last ten or from more or less of the last successful image processings. As a result, the most promising identification strategies can be applied first to a next object that should be identified.

In an advantageous embodiment of the invention it is proposed that the prioritization process assigns at least one priority value to the at least one identification strategy in the prioritization step. In particular, the prioritization process is configured for generating the prioritized list in a recursive approach. Preferably, the prioritization process assigns the same priority value to all available image capturing recipes prior to generating the prioritized list. As mentioned above, it is also conceivable that previously successful identification strategies are assigned a higher priority value than other identification strategies, in particular prior to generating the prioritized list. Furthermore, available identification strategies and/or available image capturing recipes and/or available image processing approaches are assigned at least one quality value. Advantageously, several image capturing recipes are assigned to an image processing approach, in particular to each image processing approach, and assigned a quality value indicating for instance a suitability and/or a chance for a successful image processing when using said image processing approach for an image captured using said image capturing recipe. Further preferably, the prioritization process scans through available identification strategies, in particular available image capturing approaches and/or available image processing approaches, and chooses that with a highest priority value, that with a highest quality value or preferably that with a best, in particular highest combination, preferably with a highest product, of quality value and priority value first, in particular in a first sub-step. Preferably, in a next sub-step the prioritization process lowers the priority value of the image capturing recipe of the highest priority identification strategy. Further preferably, in the next sub-step the prioritization process lowers the priority value of the image processing approach of the highest priority identification strategy, wherein said image processing approach might even be temporarily excluded, so that advantageously the prioritized list does not contain the same identification strategy twice. The prioritization process is in particular configured for generating the priority list based on this recursive proceeding. Advantageously, this recursive proceeding is followed until no image processing approaches are available, whereupon the prioritization process preferably assigns the same priority value to all image processing approaches in order to use them in a subsequent sub-step, preferably in combination with image capturing recipes that are still available. Advantageously, the prioritization process is configured for following the recursive approach until no identification strategy is available anymore owing to the low, preferably negative priority value of remaining identification strategies. As a result, an in particular complete list can be generated in an efficient manner that allows performing identification approaches in an efficient order.

In a preferred embodiment of the invention it is proposed that the prioritization process modifies, in particular decreases or increases a priority value, in particular relatively to other priority values, of other identification strategies which are similar to the at least one identification strategy, in particular upon entering the at least one identification strategy in the list. For instance, the prioritization process may be configured for, in particular relatively, lowering a priority value of image capturing recipes that are similar to the image capturing recipe of the at least one identification strategy. As a result, a comparably short prioritized list can be provided, which advantageously allows for a fast handling.

A high degree of flexibility and/or a high degree of adjustability to different tasks can be achieved, in particular if the prioritization process adjusts the priority value, in particular relatively to other quality values, of the at least one identification strategy depending on an operating mode. Advantageously, the operating mode is selectable by a user. For instance, the prioritization process may assign high priority values to identification strategies with a certain image processing approach, and in particular different image capturing recipes, in case said image processing approach has a high probability of leading to a successful identification, for instance in case a batch of similar objects is processed in series, for instance a batch of wafers of one certain manufacturer. Preferably, the prioritization process is configured for entering identification strategies with the same image processing approach several times subsequent to each other in at least one batch mode. Alternatively or additionally, the prioritization process may be configured for using identification strategies with the same image processing approach only for a selectable number of times in a row, in particular in order to allow for quickly reacting to a changing type of objects. Preferably, a persistence with respect to prioritizing identification strategies with a certain image processing approach and/or with a certain subcategory of image processing approaches, for instance for one type of label and/or mark, and/or a persistence with respect to prioritizing identification strategies with a certain image capturing recipe and/or with a certain subcategory of image capturing recipes, for instance image capturing recipes with the same illumination configuration and/or illumination color and/or illumination intensity may be selectable by the user and/or may be selected based on an operating mode selected by the user.

A high flexibility and/or a capacity to react according to changing conditions can be achieved, in particular if the method comprises a valuation process for assigning at least one quality value to the at least one identification strategy. It is conceivable that the valuation process assigns at least one approach quality value to the image processing approach of the at least one identification strategy. It is further conceivable that the valuation process assigns at least one recipe quality value to the image capturing recipe of the at least one identification strategy.

A high efficiency concerning identification of new types of objects and/or labels and/or marks can be achieved, in particular if the valuation process comprises at least one initial teach-in step for assigning an initial quality value to the at least one identification strategy. Preferably, the teach-in step is configured for determining a quality of several identification strategies via testing said strategies on a taught-in object and advantageously is configured for. In particular, the valuation process is configured for assigning a quality value to the at least one image capturing recipe and/or to the at least one image processing approach, preferably during and/or after the teach-in.

A method which is self-learning in a reliable and/or successful manner can be provided, in particular if the valuation process comprises an update step for updating the quality value of the at least one identification strategy depending on a degree of success of an image processing result. In particular, the image processing result may be a successful object identification, an unsuccessful object identification or a partly successful object identification. A partly successful object identification may for instance comprise at least one or several successfully identified characters, wherein at least one or several other characters cannot be identified and/or partly identification and/or reading of a code and/or a mark and/or a label. Alternatively or additionally it is conceivable that the priority value of a certain identification strategy is set and/or adjusted based on a teach-in and/or a processing result. Preferably, quality values and initial quality values are separately stored. Of course, it is also conceivable that initial quality values are overwritten and not stored separately as permanent quality values. Furthermore, it is conceivable that updated quality values are stored as difference from initial quality values, for instance as increase or decrease with respect to a permanent quality value.

Advantageously, quality values and/or initial quality values are assigned to identification strategies, in particular to image capturing recipes and/or image processing approaches, after successful processing of the image and/or after the object could not be identified ultimately, in particular at a point where no further attempts to identify the object are undertaken, in particular after processing at least a part of the prioritized list and/or after application of at least one auxiliary identification strategy. In particular, a quality value of an image capturing recipe and/or of an image processing approach is modified, in particular increased or decreased, in particular relative to other image capturing recipes and/or other image processing approaches, in case the image capturing recipe and/or the image processing approach could have been expected to be successful, in particular based on a type of the mark and/or label of the object. For instance, an image capturing recipe that leads to an image which could not be processed successfully, even though an image processing approach for the correct type of label and/or mark was used, may be assigned a lowered quality value. Additionally or alternatively, a quality value of an image processing approach may be lowered relatively if it did not allow for a successful processing of the image, while another image processing approach suited for identifying the same type of mark and/or label could be applied successfully.

A high degree of time efficiency can be achieved, in particular if in the update step the valuation process updates the quality value of the at least one identification strategy depending on a quality of the image processing result in an unfinished state of the image processing step. In particular, the image processing step may comprise at least two, advantageously several image processing sub-steps. Preferably, the valuation process is configured for updating the quality value of the at least one identification strategy based on a quality and/or a result of at least one image processing sub-step. For instance, the image processing step might be terminated upon a first occurring unsuccessful image processing sub-step. Furthermore, it is conceivable that the valuation process lowers a quality value and/or a priority value of an identification strategy used during the unsuccessful image processing sub-step, in particular of an image capturing recipe and/or of an image processing approach of said identification strategy upon detecting that said image processing sub-step was unsuccessful.

A high throughput can be achieved, in particular if at least two image processing sub-steps, in particular of different image processing steps, are being performed in parallel, in particular by at least two separate processors and/or at least two separated tasks and/or threads. Preferably, all image processing sub-steps of one image processing step are terminated upon detection of one unsuccessful image processing sub-step of the respective image processing step.

Advantageously, image processing sub-steps of one image are consecutively performed, whereas image processing sub-steps of different images are performed in parallel. Other types of parallel processing are also conceivable. For instance, different image processing steps of different images and/or using different image processing approaches may be performed at least temporarily in parallel, preferably by parallel processors. It is further conceivable that image processing steps and/or image processing sub-steps are directed from one logical and/or physical processor to another, in particular in an unfinished state, which preferably allows for an optimization of an overall processing speed.

The invention further relates to an object identification device, in particular to a substrate identification device, in particular to a wafer identification device, in particular for performing the method for identifying object, comprising an image capturing unit being configured for capturing at least one image of at least one object according to at least one highest priority identification strategy of a prioritized list of identification strategies, and comprising a control unit being configured for generating the prioritized list, the prioritized list comprising at least one identification strategy, and the control unit being configured for processing the image according to the highest priority identification strategy of the prioritized list.

By means of the invention a high degree of time-efficiency can be achieved. Furthermore, suitable strategies for identifying an object can be efficiently identified and/or applied. Advantageously, an efficient object identification for implementation in a production process can be provided. In particular, wafers with different labels and/or marks can be fast and/or reliably identified and/or traced and/or kept track of, in particular in a production process. Furthermore, combinations of illumination conditions and analysis approaches can be sorted by an expected chance of success in a precise manner. Advantageously, a method and/or a device can be provided which is self-learning, in particular in a purposeful and/or targeted and/or efficient manner. Furthermore, a parallel analysis of images is advantageously enabled, in particular without the need for a pre-assessment of images.

In particular, the object identification device comprises at least one user interface, which is configured for allowing a user to input at least one operating parameter for operation of the object identification device. For instance, the user interface is configured for allowing the user to choose an operation mode and/or a prioritization mode of the prioritization process and/or an image capturing mode of the image capturing unit or the like.

In particular, the image capturing unit is configured for performing the image capturing step. Advantageously, the image capturing unit performs the identification process together with the control unit. Preferably, the image capturing unit comprises at least one digital camera and/or at least one image sensor and/or at least one optical element, in particular at least one lens and/or at least one mirror and/or semi-transparent mirror. It is conceivable that the image capturing unit is integrated in a fabrication line and/or a transport band assembly for objects, in particular wafers. Additionally or alternatively it is conceivable that the control unit is arranged spaced from the image capturing unit and/or communicatingly connected to the image capturing unit. In particular, the image capturing unit is configured for taking an image of the object according to the image capturing recipe and preferably according to any possible image capturing recipe. Advantageously, an adjustability of the image capturing device defines all possible image capturing recipes.

In particular, the control unit is configured for performing the prioritization process and/or the valuation process. Alternatively or preferably in addition the control unit is configured for performing the image processing step. Preferably, the control unit is configured for performing the identification process together with the image capturing unit. In particular, the control unit comprises at least one, preferably several, processors and/or the data base and/or the least one data storage unit and/or at least one permanent memory and/or at least one working memory. Advantageously, the control unit comprises at least one controller, which is configured for distributing different image processing sub-steps to different processors and/or to different logical processors of the control unit. Further advantageously, controller is configured for terminating all image processing sub-steps in case of an unsuccessful identification, for instance indicated by at least one unsuccessful image processing sub-step.

It is conceivable that the control unit and/or the image capturing unit and/or the user interface are partly or entirely implemented integrally. For instance, the control unit and/or the image capturing unit and/or the user interface may share at least one circuit board and/or at least one housing and/or at least one electronic circuit and/or at least one processor and/or at least one mechanical element or the like.

Furthermore, a system comprising the object identification device and the object allows for reliable and/or fast recognition and/or identification of the object.

Herein, the method for identifying an object and the object identification device according to the invention are not to be limited to the application and implementation described above. In particular, for the purpose of fulfilling a functionality herein described, the method for identifying an object and the object identification device according to the invention may comprise a number of respective elements, structural components, units and/or steps that differ from the number mentioned herein. Furthermore, regarding the value ranges mentioned in this disclosure, values within the limits mentioned are to be understood to be also disclosed and to be used as applicable.

DRAWINGS

Further advantages may become apparent from the following description of the drawings. In the drawing an exemplary embodiment of the invention is shown. The drawings, the description and the claims contain a plurality of features in combination. The person having ordinary skill in the art, will purposefully also consider the features separately and will find further expedient combinations.

Figure 2:
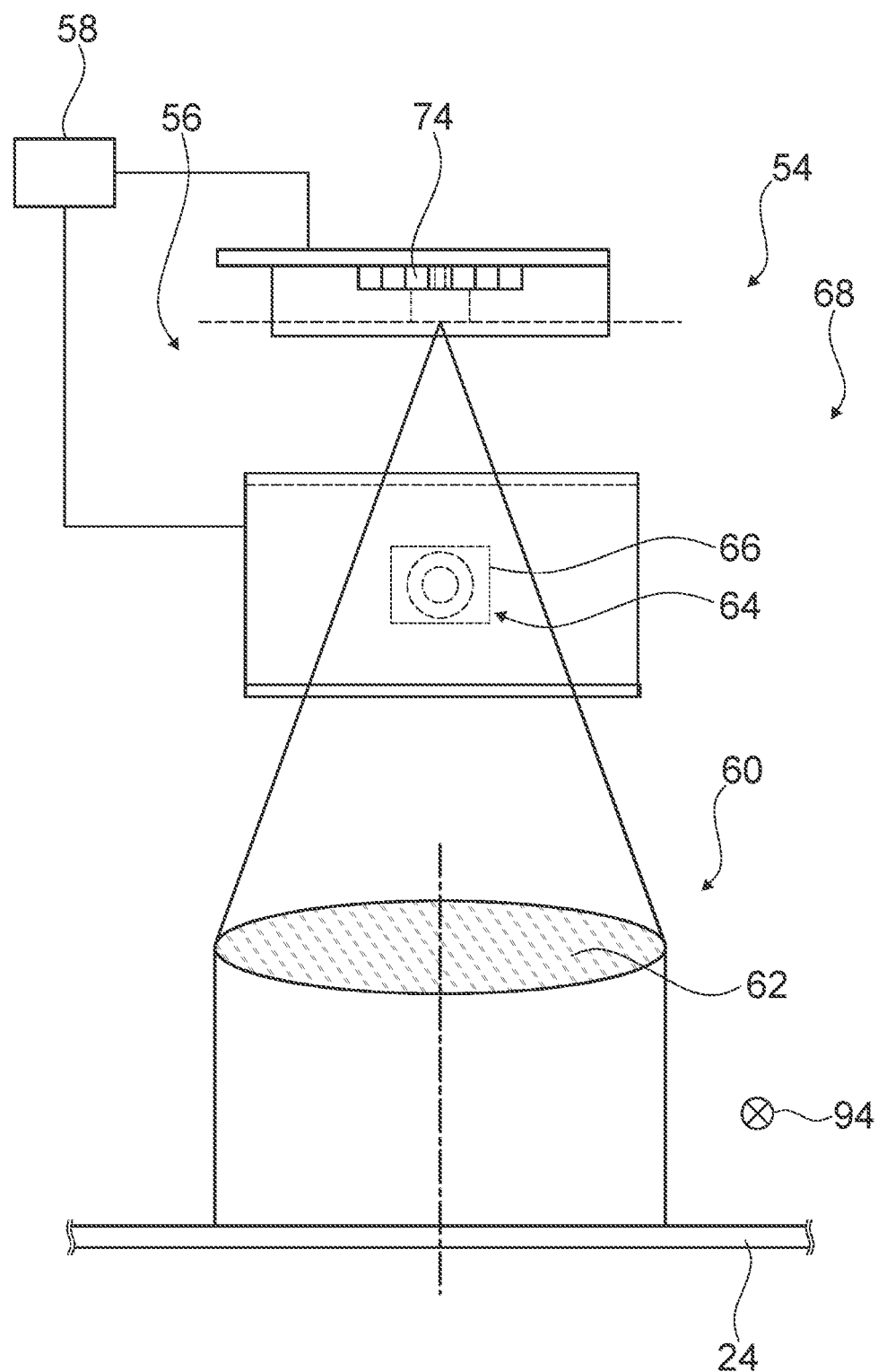
Figure 3:
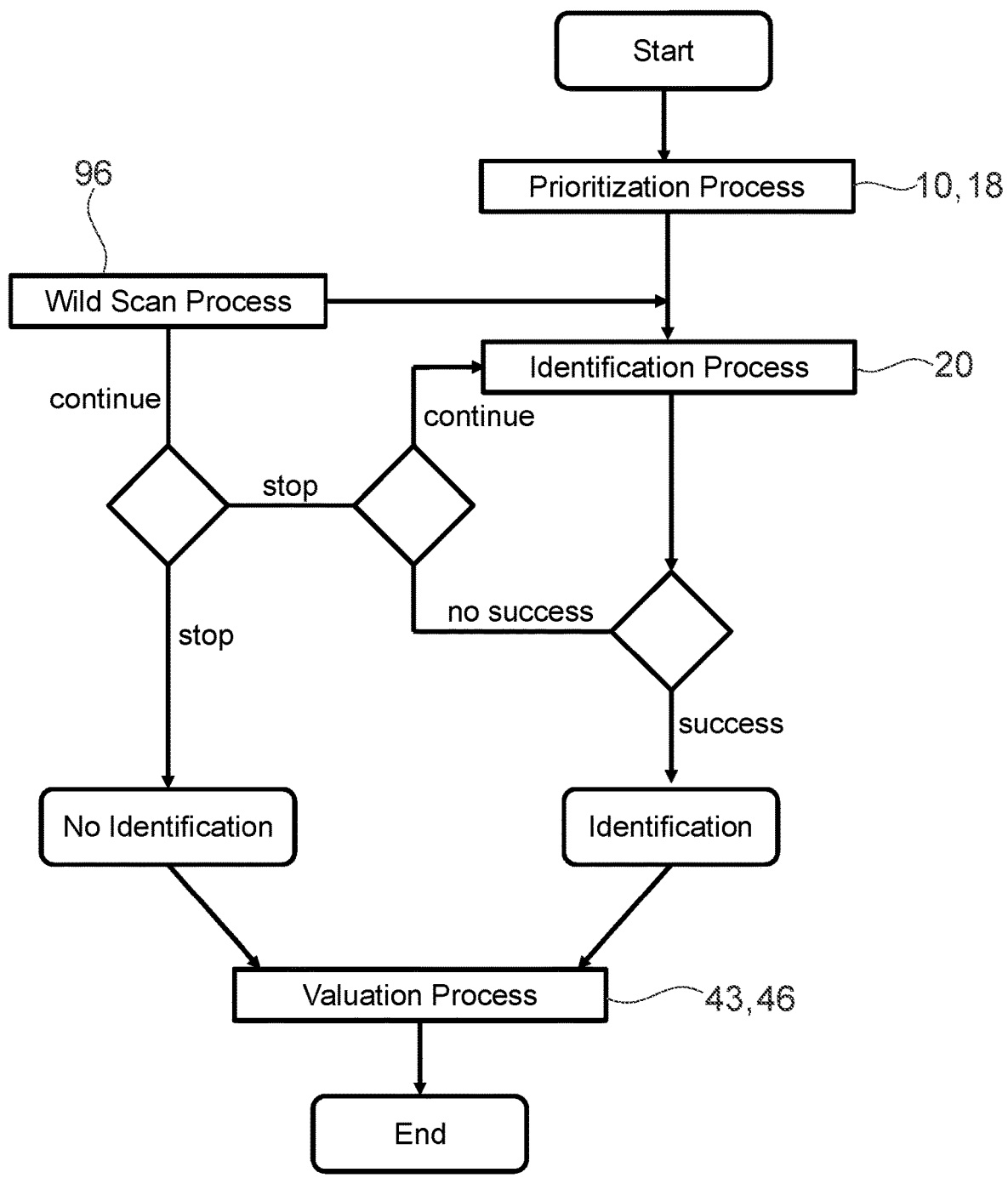
Figure 4:
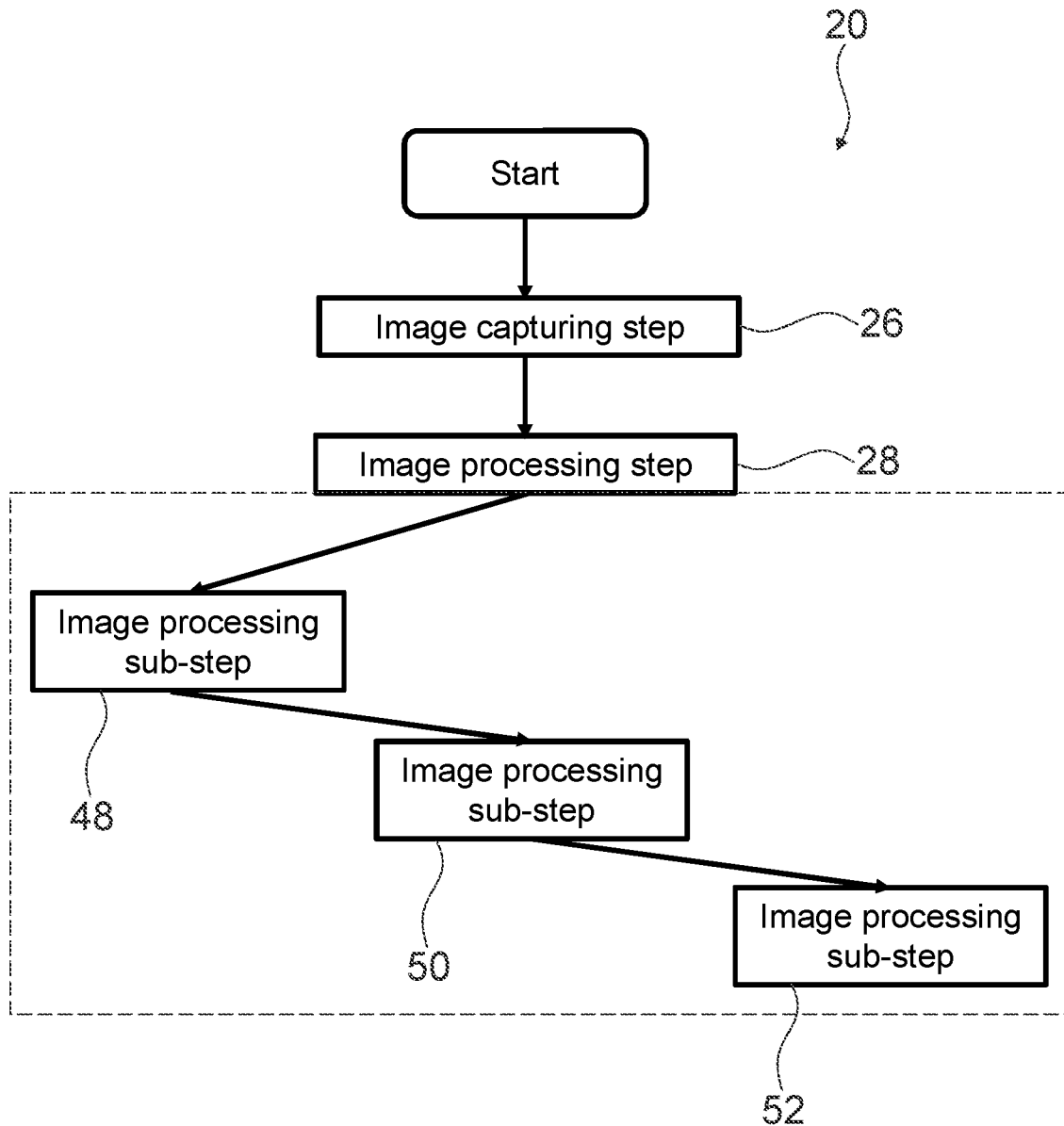
Figure 5:
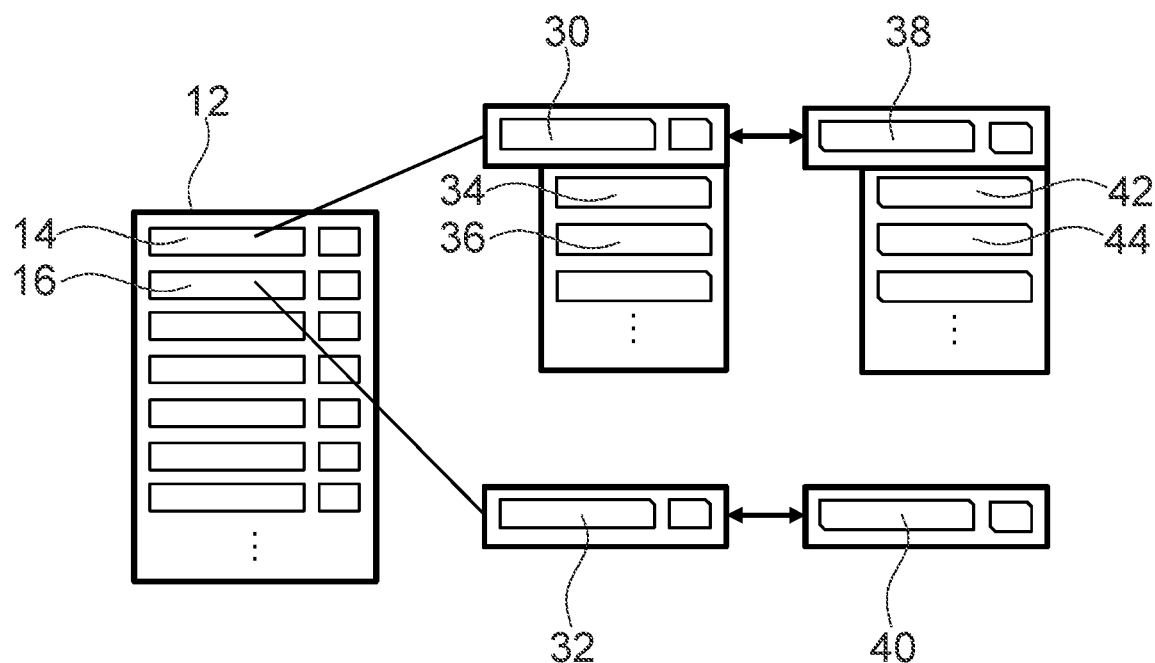
Figure 6:
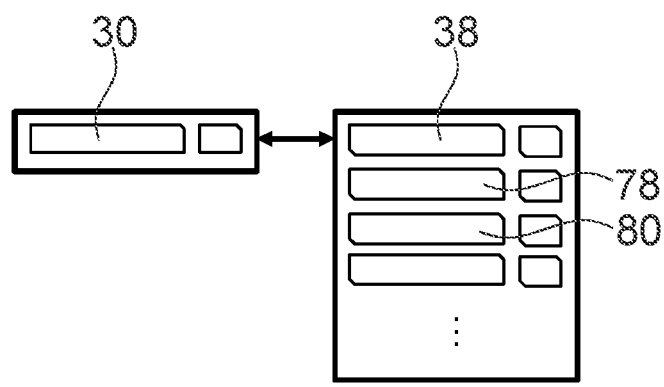
Figure 7:
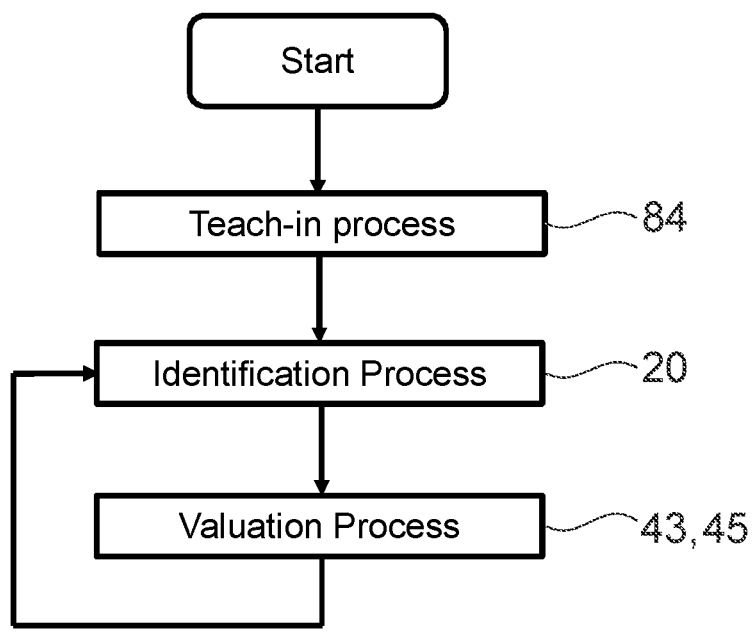

If there is more than one specimen of a certain object, only one of these is given a reference numeral in the figures and in the description. The description of this specimen may be correspondingly transferred to the other specimens of the object. It is shown in:

FIG. 1 an object identification device in a schematic lateral view,

FIG. 2 the object identification device in a schematic front view,

FIG. 3 a schematic flow chart of the method for identifying the object,

FIG. 4 a schematic flow chart of an identification process of the method for identifying the object, FIG. 5 a prioritized list of identification strategies for a method for identifying the object in a schematic representation, FIG. 6 an image processing approach of the method for identifying the object in a schematic representation, and FIG. 7 a schematic flow chart of a teach-in for the method for identifying the object.

DESCRIPTION OF THE EXEMPLARY EMBODIMENTS

FIG. 1 shows an object identification device 54 in a schematic lateral view. FIG. 2 shows the object identification device in a schematic front view. In the case shown the object identification device 54 is implemented as a wafer identification device. Furthermore, in FIGS. 1 and 2 a system comprising the object identification device 54 and an object 24 is shown. In the case shown the object 24 is implemented as a wafer, in particular a silicon wafer. The object identification device 54 is integrated in a fabrication line which is configured for processing wafers.

The object identification device 54 comprises an image capturing unit 56 configured for capturing at least one image 22 of the object 24. In the shown case the image is an image of a portion of the object 24 defined by an optical configuration 60 of the image capturing unit 56. The optical configuration comprises a field lens 62. The image capturing unit 56 comprises a camera unit 64. The camera unit 64 comprises at least one image sensor 66. Furthermore, the image capturing unit 56 comprises an illumination unit 68. The illumination unit 68 comprises several light sources 70, 72, 74, 86, 88, 90, 92 which are only schematically shown in FIGS. 1 and 2. In the case shown, the light sources 70, 72, 74, 86, 88, 90, 92 are implemented as LED light sources. Furthermore, illumination may be performed via at least one external light source 94. For reasons of clarity, some light sources 70, 72, 86, 88, 90, 92 are not shown in FIG. 2. It is conceivable that the illumination unit 68 comprises at least one light source array. In particular, the illumination unit 68 may comprise more light sources than shown in the figure, for instance depending on a size of the light source array. The illumination unit 68 is configured for generating different illumination conditions for the object 24. In the case shown the illumination unit 68 is configured for providing 180 different illumination intensities, which in particular span approximately four orders of magnitude. Of course, other values, for instance a higher number and/or a broader span of illumination intensities is conceivable. Furthermore, the illumination unit 68 is configured for providing illumination of the object 24 in different illumination modes, for instance in a bright field mode (using for instance the central light source 72), in a dark field focused mode, in a dark field inner rows mode (using for instance the light sources 88, 90), in a dark field outer rows mode (using for instance the light sources 86, 92), in a dark field all rows mode (using for instance the light sources 86, 88, 90, 92) or in an external light mode (using for instance the external light source 94), in particular defined by an illumination pattern of the light sources 70, 72, 74, 86, 88, 90, 92, 94. In particular, the illumination unit 68 is configured for providing six different illumination modes, wherein of course a higher or smaller number of possible illumination modes is conceivable. In addition, the illumination unit 68 is configured for illumination of the object using three different colors, in particular red, green and blue. Of course, other colors and/or color mixes are conceivable. In total, the illumination unit 68 is configured for illuminating the object 24 in 3240 different configurations. In the case shown, each configuration implements one image capturing recipe. It is also conceivable, that a certain image capturing recipe is further defined by an operation mode and/or at least one imaging parameter of the camera unit 64.

The object identification device 54 comprises a control unit 58. The control unit 58 is communicatingly connected to the image capturing unit 56. The control unit 58 is configured for controlling the illumination unit 68. The control unit 58 is configured for controlling the camera unit 64. The control unit 58 comprises a data storage unit for storing data, in particular images.

In the case shown, the object 24 features a mark 76. The mark 76 is implemented as a bar code. In the fabrication line, wafers of different manufacturers and/or with different marks and/or labels are processed and identified using the object identification device 54, in particular prior to a first processing step and after different processing steps of the wafers. The object identification device 54 is configured for identifying objects based on different marks or labels, in the case shown including semi-code bar codes, IBM-code bar codes, data matrix codes, QR-codes, 1D codes, 2D codes, and different written and/or printed labels, character strings, numbers, symbols, logograms, phonograms, graphems or the like.

The object identification device 54 is configured for performing a method for identifying objects, in particular the object 24. FIG. 3 shows a schematic flowchart of the method for identifying objects. In the case shown the method is a method for identifying wafers. The method comprises a prioritization process 10 for generating a prioritized list 12 of identification strategies 14, 16 comprising at least one identification strategy 14, 16 in at least one prioritization step 18. The prioritized list 12 is shown in a schematic representation in FIG. 5. The method further comprises an identification process 20 for capturing at least one image 22 of the object 24 in at least one image capturing step 26 according to at least one highest priority identification strategy 14 of the prioritized list 12. Furthermore, the identification process is configured for processing the image 22 in at least one image processing step 28 according to the highest priority identification strategy 14 of the prioritized list. A schematic flowchart of the identification process 20 is shown in FIG. 4.

The image capturing unit 56 is configured for capturing the image 22 of the object 24 according to the highest priority identification strategy 14 of the prioritized list 12. Furthermore, the image capturing unit 56 is configured for transmitting the image 22 to the control unit 58. The control unit 58 is configured for generating the prioritized list 12. In particular, the control unit 58 is configured for performing the prioritization process 10. Furthermore, the control unit 58 is configured for processing the image 22 according to the highest priority identification strategy 14. In particular, the control unit 58 is configured for performing the image processing step 28. The image capturing unit 56 and the control unit 58 are together performing the identification process 20.

The identification process 20 is configured for identifying the object 24. In case of a successful identification the object 24 is recognized. The control unit 58 is configured for determining a success of an identification result of the image 22.

The first entry of the prioritized list 12 is the identification strategy 14 of highest priority, i.e., the highest priority identification strategy 14. In the case shown the list contains several different identification strategies 14, 16, only two of which are assigned reference numerals for reasons of clarity. The identification strategies 14, 16 comprise one image processing approach 30, 32 each, featuring at least one image processing parameter 34, 36. For reasons of clarity, image processing parameters 34, 36 are only shown for one processing approach 30 and only exemplarily in FIG. 5. The image processing parameters 34, 36 define the image processing approach 30. The image processing parameters 34, 36 contain information about a decoding method that should be applied during the image processing step 28 and/or about a type of a code and/or character recognition and/or about filtering of an image 22 and the like. The control unit 58 is providing several different possible image processing approaches 30, 32, only two of which are shown in FIG. 5.

The identification strategies 14, 16 comprise one image capturing recipe 38, 40 each, featuring at least one image capturing parameter 42, 44. For reasons of clarity, image capturing parameters 42, 44 are only shown for one image capturing recipe 38 and only exemplarily in FIG. 5. The image capturing parameters 42, 44 define the image capturing recipe 38. The image capturing parameters 42, 44 contain information about the illumination intensity, the illumination mode and the illumination color. As mentioned above, in the case shown the illumination unit 68 provides a total of 3420 different image capturing recipes 38, 40.

The identification process 20 comprises a sequential processing of the prioritized list 12. In the case shown a first image 22 is captured using the highest priority identification strategy 14. In particular, the image 22 is taken using the image capturing recipe 38 of the identification strategy 14. Subsequently, the image 22 is processed according to the identification strategy 14. In particular, the image 22 is processed using the image processing approach 30 of the identification strategy 14. In case the object 24 could not be identified and/or a time limit is not reached and/or no other stop condition is present, a next image is captured according to the second entry of the prioritized list 12, in the case shown according to the second highest priority identification strategy 16.

The image processing step 28 comprises at least two image processing sub-steps 48, 50, 52. In FIG. 4, three image processing sub-steps 48, 50, 52 are shown exemplarily, while the image processing step 28 might in fact comprise a higher number of sub-steps, some of which may be parallely and/or subsequently performed or performable. The control unit 58 comprises several processors and a controller for distributing the image processing sub-steps 48, 50, 52 to the processor. It is also conceivable that sub-steps are distributed to different logical processors. Furthermore, it is conceivable that the control unit 58 comprises a single processor and/or that sub-steps are performed as individual threads by the same processor. The image processing step 28 is configured for parallel processing of images 22, which advantageously allows for a high throughput. Each image processing sub-step 48, 50, 52 comprises at least one function, which determines at least one evaluation number when being performed for the image 22. Furthermore, each image processing sub-step 48, 50, 52 generates at least one output parameter. Each processor performs one image processing sub-step 48, 50, 52 and delivers the respective evaluation number to the controller. Based on this evaluation number the controller either triggers the next processor to perform the next image processing sub-step 48, 50, 52 or terminates the entire image processing step 28. In case there are unused processors, the controller sends image processing sub-steps of another image to those processors. Image processing sub-steps 48, 50, 52 of different images are thus performed in parallel.

This parallel processing is exemplarily illustrated in the following table, where Ii is a capturing of the i-th image in an image capturing step, Pji is the j-th image processing sub-step for the i-th image, T(i) is a termination of an image processing step of the i-th image and S(i) is a successful identification of an object using the i-th image:

| Image | I1 | I2 | I3 | I4 | I5 | I6 | I7 | I8 | I9 | I10 |
|---|---|---|---|---|---|---|---|---|---|---|
| Processor 1 | | P11 | P21 | | P14 | P24 | P34 | P44 | P54 | |
| Processor 2 | | | P12 | P22 | | P15 | P25 | P35 | P18 | |
| Processor 3 | | | | P13 | P23 | P33 | P16 | P17 | P27 | |
| Controller | | | | T(1) | T(2) | | T(3) | T(6) | T(5) | S(4) |

The procedure illustrated in the table is to be understood purely exemplarily. It is conceivable that tasks are differently distributed to different processors. For instance, an entire image processing for a certain image may be performed by one processor, several sub-steps may be performed by parallel processors and/or tasks may be directed from at least one processor to at least one other processor before being finished, for instance in order to minimize a processing time and/or reduce waiting times or the like. It is also conceivable that several processors are used in parallel for one task in order to accelerate a processing.

The prioritization process 10 is configured for generating the prioritized list 12 in a recursive approach. The prioritization process 10 is configured for generating the prioritized list 12 based on quality values and priority values of identification strategies 14, 16. FIG. 6 shows a schematic representation of possible combinations of an image processing approach 30 and image capturing recipes 38, 78, 80. Possible identification strategies 14, 16, in particular possible image processing approaches 30, 32 and possible image capturing recipes 38, 40, 78, 80 are stored in a data base. The control unit 58 comprises the data base. Furthermore, the data base contains information about a suitability of a certain image capturing recipe 38, 40, 78, 80 when used together with a certain image processing approach 30, 32. In particular, different image capturing recipes 38, 40, 78, 80 may be suitable for different image processing approaches 30, 32, for instance depending on a type of a mark and/or label that should be identified.

In particular, the prioritization process 10 is performed prior to each identification of a new object. Once the object 24 is identified using a successful identification strategy 14, 16 of the prioritized list 12, or the object 24 is ultimately not identified a new prioritized list is generated. This enables self-learning of the method, in particular since successful identification strategies 14, 16 may be preferably used and/or unsuccessful identification strategies 14, 16 may be excluded or at least be applied with lower priority.

Prior to generating the prioritized list 12, the prioritization process 10 assigns the same priority value to all available image processing approaches 30, 32. Furthermore, in a first step the prioritization process 10 finds the identification strategy 14 with a product highest combination of quality value and priority value, for instance a highest product or a highest sum or another combination, of the respective image capturing recipe 38 in combination with the respective image processing approach 30 of this identification strategy 14. This identification strategy 14 is entered in the prioritized list 12 as highest priority identification strategy 14. In a next step, a priority of the image capturing recipe 38 of the identification strategy 14 and/or a priority value of the image processing approach 30 of the identification strategy 14 is lowered. Subsequently, the first step is repeated, then the second and so on. In particular, the image processing approach 30 may be excluded temporarily for one or several next step(s) after entering the identification strategy 14 in the prioritized list. In this case each image processing approach 30, 32 may be entered in the prioritized list only once until no further image processing approaches are left. Subsequently, the same priority value may be again assigned to all image processing approaches 30, 32 in order to render them available again. This procedure may be repeated until there are no image capturing recipes 38, 40, 78, 80 left with a positive priority value.

However, it is also conceivable that a certain image processing approach 30, 32 is assigned a higher priority value depending on an operating mode of the method and/or of the object identification device 54. For instance, in a batch-mode it may be suitable to use identification strategies with the same image processing approach subsequently, for instance if several objects, in particular wafers, with the same type of mark and/or label are expected to occur in series. Advantageously, in this case the prioritization process 10 adds at least one previously successful identification strategy to the prioritized list 12 first. Upon successful identification of an object the priority value of the used identification strategy may be increased so that in a subsequent generation of a prioritized list 12 this identification strategy is used first.

In order to shorten the prioritized list 12 and thus reduce a time for processing the prioritized list 12 the prioritization process 10 may modify, in particular lower a priority value, in particular relatively to other priority values, of other identification strategies which are similar to the identification strategy 14, in particular upon entering the identification strategy 14 into the prioritized list 12. For instance, the prioritization process 10 may, in particular relatively, lower a prioritization value of image capturing recipes with a similar illumination level and/or the same illumination channel and/or a similar and/or the same illumination mode as the image capturing recipe 38 of the identification strategy 14 that has been entered in the prioritized list 12. It is also conceivable that the prioritization process 10 is configured for lowering a prioritization value of all image capturing recipes assigned to the image processing approach 30 of the identification strategy 14 that has been entered in the prioritized list 12, in particular in order to temporarily or permanently exclude this image processing approach 30.

As mentioned before, the prioritization process 10 adjusts the priority value of a certain identification strategy 14, 16 depending on an operating mode. In the case shown the operating mode is selectable by a user. Depending on the operating mode a degree of persistence in choosing certain types of identification strategies 14, 16, preferably depending on their image processing approaches 30, 32, of the prioritization process 10 is adjusted. As a result, the same image processing approach 30 may be applied in combination with several different image capturing recipes 38, 78, 80 prior to applying a different image processing approach 32. In the case shown the method may be performed in a batch mode, which implements a high persistence, in an advanced mode, which is characterized by an in particular adjustable medium degree of persistence, or in a last-best mode, in which a last successful identification strategy is applied as highest priority identification strategy in a next prioritized list. Furthermore, in the case shown the advanced mode is based on a combination of the batch mode and the last-best mode.

In case all identification strategies 14, 16 of the prioritized list 12 have been applied to the object 24 in an unsuccessful manner or in case a time limit is reached or in case a further stop condition is present, an auxiliary mode may be entered. In particular, whether or not an auxiliary mode is entered may be selectable by a user. Alternatively, the object 24 may be ultimately not identified. In the auxiliary mode, a wild scan process 96 is performed as described above. The wild scan process 96 generates a wild scan list of auxiliary image capturing recipes, which are not in the prioritized list 12. In particular, different auxiliary image capturing recipes are, in particular randomly, chosen from a pre-defined list of image capturing recipe. An image of the object 24 is captured according to an auxiliary image capturing recipe from the wild scan list. This image is processed using at least one or several or preferably all available image processing approaches in one or several respective image processing steps. In case the object could not be identified, a next auxiliary image is captured according to a next auxiliary image capturing recipe from the wild scan list and processed analogously. As described above, threshold values may be derived from results of sub-steps of the auxiliary image processing step and/or results of sub-steps of the auxiliary image processing step may be compared to such threshold values. Depending on results of sub-steps an auxiliary image processing may be terminated in an unfinished state. Alternatively to generating a wild scan list it is also conceivable to randomly choose and directly apply one auxiliary identification strategy after the other. The auxiliary mode may be terminated upon successfully identifying the object or after reaching a stop condition, for instance after reaching the end of the wild scan list or after reaching a time limit.

The method comprises a valuation process 43 for assigning at least one quality value to the at least one identification strategy 14. The valuation process 43 comprises at least one initial teach-in step 45 for assigning an initial quality value to the identification strategy 14. In particular, a positive quality value and/or initial quality value corresponds to a successful object identification. Furthermore, a negative quality value and/or a negative initial quality value corresponds to an unsuccessful object identification. A schematic flow chart of a teach-in procedure of the method is shown in FIG. 7. The teach-in procedure comprises a teach-in process 84 which generates a teach-in list of identification strategies 14. The teach-in list may be partly generated using user input, for instance concerning a type of a label and/or a mark. Based on the user input the teach-in process may select certain image processing approaches 30 and/or certain image capturing recipes 38 with higher priority than others. Preferably, the teach-in list contains a broad but coarse distribution of possible identification strategies, in particular different image capturing parameters. The identification strategies 14 of the teach-in list are used in an identification process. Based on a quality of an image processing result, the valuation process assigns a certain quality value to an image processing approach 30 and/or to an image capturing recipe 38 of a current identification strategy 14 in the teach-in step 45. In the case shown image capturing recipes 38 with different illumination colors, illumination intensities and illumination modes are applied and valuated during the teach-in. Subsequently, the, preferably six, highest quality identification strategies 14, in particular comprising one pre-defined image processing approach 30 and several, in particular six, different image capturing recipes 38, are selected and used as a starting point for a second teach-in list with a finer distribution of identification strategies similar to the highest quality identification strategies 14. It is also conceivable that the teach-in is performed in one step only or in even more steps, preferably going from a coarse to a fine distribution of identification strategies.

Results of the teach-in procedure, in particular initial quality values of identification strategies 14, are permanently stored as a reference and/or as a starting point for generating the prioritized list 12.

The valuation process 43 comprises an update step 46 for updating the quality value of the at least one identification strategy 14 depending on a quality of an image processing result. The update step 46 is performed after successful identification of the object 24 or after the object 24 is ultimately not identified. In particular, in case of a successful identification of the object 24 a high quality value is assigned to the respective identification strategy 14 and or its image capturing recipe 38, in particular in combination with its image processing approach 30. Furthermore, in case of an unsuccessful identification of the object 24 a low quality value is assigned to the respective identification strategy 14 and or its image capturing recipe 38, in particular in combination with its image processing approach 30. In the case shown, the update process 46 only updates identification strategies that could have potentially lead to an identification of the object 24 or that lead to an identification of the object 24, in particular identification strategies with image processing approaches that are suitable for identifying the object 24 based on a type of the mark 76 or label of the object 24. For instance, if the mark 76 has been successfully identified as a bar code, only identification strategies suited for identifying and/or reading bar codes and/or their image capturing recipes and/or their image processing approaches are assigned updated quality values, whereas identification strategies suited for identifying a QR code, a character string, a matrix code or other labels and/or marks different from a bar code are in particular not assigned updated quality values.

The update step 46 is implemented similarly or identically to the initial teach-in step 45. However, updated quality values are stored separately from the permanent initial quality values in the data base. Thus, a reference of initial quality values is available even after the method went through several self-learning cycles. Of course, it is also conceivable that initial quality values are overwritten and/or only the most recent quality value for an identification strategy and/or an image processing approach and/or an image capturing recipe is stored. Furthermore, quality values may be stored relatively to initial quality values, for instance as difference or as factor. It is also conceivable that initial quality values are assigned to identification strategies by the update step 46 in case these identification strategies have not been assigned initial quality values in a teach-in step 45. For instance, after performing a teach-in procedure, initial quality values might be available only for identification strategies with a certain, in particular newly added, image processing approach, for instance corresponding to a new type of wafer, only in combination with certain image capturing recipes, for instance based on using only a certain illumination channel. In case none of these identification strategies can be applied successfully, an object may be identified using an auxiliary image capturing recipe in combination with a certain image processing approach, which may then be assigned initial quality values for the first time. In particular, initial quality values may be assigned to the image capturing recipe and/or the image processing approach of a respective identification strategy based on this image capturing recipe and this image processing approach, in particular in order to expand the two-staged memory. As a result, self-learning can be implemented.

In the case shown the valuation process 43 is further configured for updating the quality value of the identification strategy 14 in the update step 46 depending on a quality of the image processing result in an unfinished state of the image processing step, in particular depending on an evaluation number of an image processing sub-step 48, 50, 52. In particular, the quality value is updated once there is an unsuccessful image processing sub-step 48, 50, 52, which relates to the case of an unsuccessful object identification. As a result, less promising image processings can be terminated easily, while the method may still learn from unsuccessful image processing attempts.

Additionally or alternatively, it is conceivable that identification strategies permanently stored in the data base are used as starting point for self-learning. In case of a partly successful object identification, for instance if single characters and/or a part of a code are identified, image capturing parameters and/or image processing parameters may be in particular slightly adjusted and a next identification process may be started. This may be repeated until a successful identification of the object 24 is achieved. Results may also be permanently stored, advantageously implementing a self-learning process, in particular if a time window for such a procedure is available, for instance due to a situation in the fabrication line.

In the case shown, self-learning is implemented through updating of quality values of identification strategies and by assigning priority values to identification strategies based on previous successful or unsuccessful object identifications. However, it is also conceivable to implement self-learning based on one of these proceedings only. Furthermore, in the case shown the data base provides a two-staged memory of image processing approaches and of image capturing recipes, which may be assigned separate quality values and/or priority values.

The invention claimed is:

1. A method for identifying objects, in particular substrates, in particular wafers, comprising: a prioritization process for generating a prioritized list of identification strategies comprising at least one identification strategy in at least one prioritization step; the prioritization process assigning at least one priority value to the at least one identification strategy in the prioritization step and modifying a priority value of other identification strategies which are similar to the at least one identification strategy; and an identification process for capturing at least one image of at least one object in at least one image capturing step according to at least one highest priority identification strategy of the prioritized list and processing said image in at least one image processing step according to the highest priority identification strategy of the prioritized list.

2. The method according to claim 1, the identification process comprising a sequential processing of the prioritized list.

3. The method according to claim 1, the at least one identification strategy comprising at least one image processing approach featuring at least one image processing parameter.

4. The method according to claim 1, the at least one identification strategy comprising at least one image capturing recipe featuring at least one image capturing parameter.

5. The method according to claim 1, the prioritization process adding at least one previously successful identification strategy to the prioritized list first.

6. The method according to claim 1, the prioritization process adjusting the priority value of the at least one identification strategy depending on an operating mode.

7. The method according to claim 1, further comprising a valuation process for assigning at least one quality value to the at least one identification strategy.

8. The method according to claim 7, the valuation process comprising at least one initial teach-in step for assigning an initial quality value to the at least one identification strategy.

9. The method according to claim 7, the valuation process comprising an update step for updating the quality value of the at least one identification strategy depending on a quality of an image processing result.

10. The method according to claim 9, the valuation process updating the quality value of the at least one identification strategy in the update step depending on a quality of the image processing result in an unfinished state of the image processing step.

11. The method according to claim 1, the image processing step comprising at least two image processing sub-steps being performed in parallel.

12. An object identification device, in particular substrate identification device, in particular wafer identification device, in particular for performing a method according to claim 1, comprising:

an image capturing unit being configured for capturing at least one image of at least one object according to at least one highest priority identification strategy of a prioritized list of identification strategies; and a control unit being configured for generating the prioritized list, the prioritized list comprising at least one identification strategy, and the control unit being configured for processing the image according to the highest priority identification strategy of the prioritized list.

13. A system comprising: the object identification device according to claim 12 and the object.

14. A method for identifying objects, in particular substrates, in particular wafers, comprising: a prioritization process for generating a prioritized list of identification strategies comprising at least one identification strategy sorted by an estimate of an a priori chance for being successfully applied to the object in at least one prioritization step; the prioritization process assigning at least one priority value to the at least one identification strategy in the prioritization step and modifying a priority value of other identification strategies which are similar to the at least one identification strategy; and an identification process for capturing at least one image of at least one object in at least one image capturing step according to at least one highest priority identification strategy of the prioritized list and processing said image in at least one image processing step according to the highest priority identification strategy of the prioritized list.

15. The method according to claim 14, the prioritization process adding at least one previously successful identification strategy to the prioritized list first.

16. The method according to claim 14, the prioritization process assigning at least one priority value to the at least one identification strategy in the prioritization step and adjusting the priority value of the at least one identification strategy depending on an operating mode.

17. The method according to claim 14, further comprising a valuation process for assigning at least one quality value to the at least one identification strategy, the valuation process comprising an update step for updating the quality value of the at least one identification strategy depending on a quality of an image processing result.

* * * * *